(12) United States Patent
Huang

(10) Patent No.: US 7,942,553 B2
(45) Date of Patent: May 17, 2011

(54) LIGHTING DEVICE AND OPTICS PACKAGE THEREFOR

(75) Inventor: Frank F Huang, Lakewood, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 204 days.

(21) Appl. No.: 12/173,859

(22) Filed: Jul. 16, 2008

(65) Prior Publication Data

US 2009/0190338 A1    Jul. 30, 2009

Related U.S. Application Data

(60) Provisional application No. 61/023,577, filed on Jan. 25, 2008.

(51) Int. Cl.
*F21V 5/04* (2006.01)

(52) U.S. Cl. ............... 362/268; 362/311.02; 362/311.03; 362/202

(58) Field of Classification Search .................. 362/268, 362/331–332, 184, 240, 300, 307–310, 296.02, 362/311.01–311.04, 326–329, 202–208, 362/84; 257/98, 791

See application file for complete search history.

(56) References Cited

U.S. PATENT DOCUMENTS

| | | | | |
|---|---|---|---|---|
| 5,225,928 A | * | 7/1993 | Dugan | 359/356 |
| 6,485,160 B1 | * | 11/2002 | Sommers et al. | 362/184 |
| 6,504,301 B1 | * | 1/2003 | Lowery | 313/512 |
| 7,111,964 B2 | * | 9/2006 | Suehiro et al. | 362/328 |
| 2006/0034082 A1 | * | 2/2006 | Park et al. | 362/268 |
| 2007/0030675 A1 | * | 2/2007 | Oon et al. | 362/237 |
| 2007/0258244 A1 | | 11/2007 | Curran et al. | |

OTHER PUBLICATIONS

Patent Cooperation Treaty (PCT), International Search Report and Written Opinion for Application PCT/US2009/031820 filed Jan. 23, 2009, Mailed Sep. 7, 2009, Korean Intellectual Property Office.

* cited by examiner

*Primary Examiner* — Thomas M Sember
(74) *Attorney, Agent, or Firm* — Michael C. Pophal

(57) ABSTRACT

A lighting device is generally illustrated having a light body having forward facing light sources including a visible white light source, visible colored light source and an infrared light source. Additionally, a side facing light source is provided. The light body also includes switches for activating the visible light sources and a three-position switch for activating the IR light source and the side facing light source. A light source has a first lens. Additionally, a second lens is included in a light illumination path of the light source to focus light illumination into a desired beam. The lighting device further includes a light transparent gel disposed between the first lens and the second lens for enhancing efficiency of light transmission from the first lens to the second lens.

30 Claims, 13 Drawing Sheets

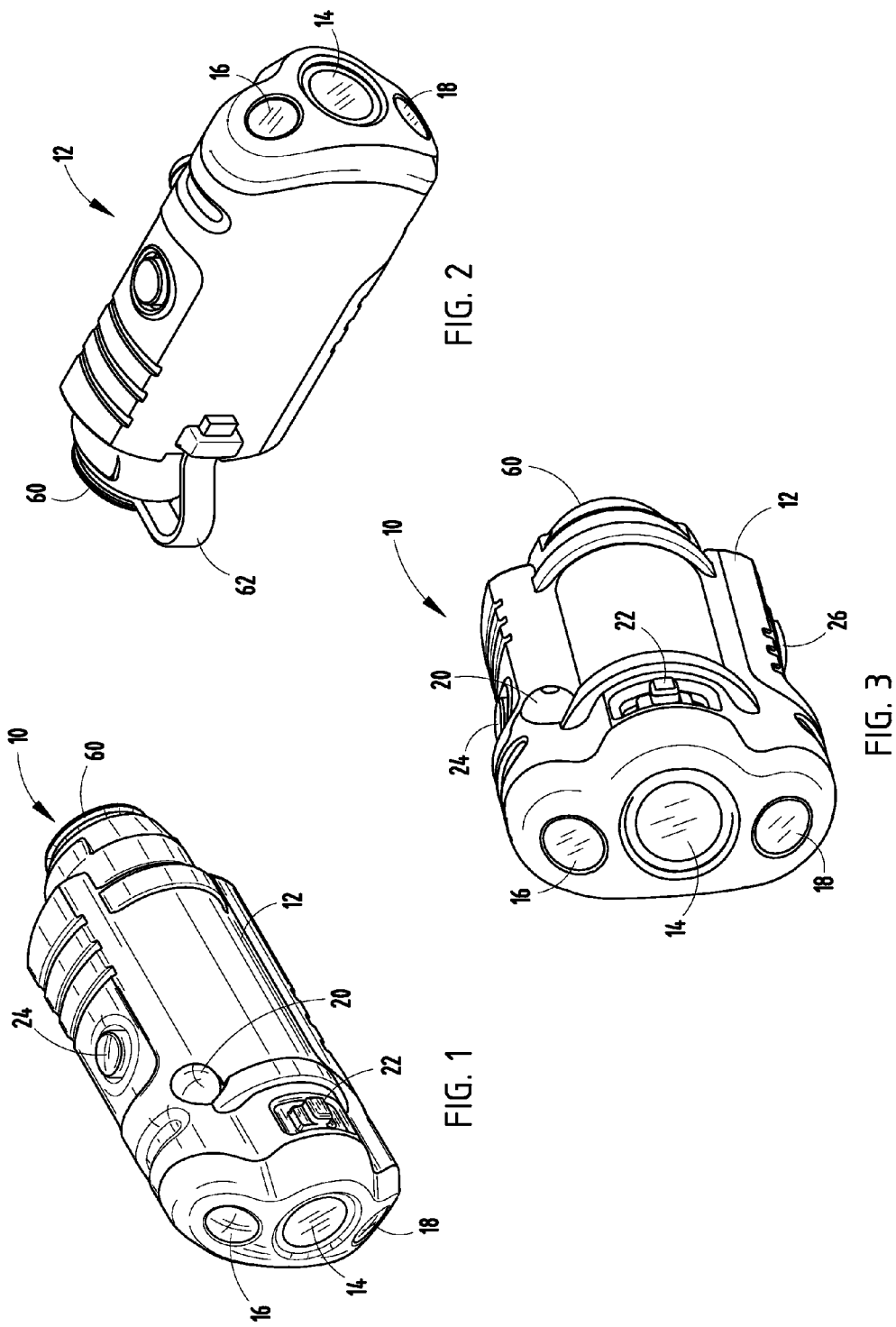

US 7,942,553 B2

LIGHTING DEVICE AND OPTICS PACKAGE THEREFOR

CROSS-REFERENCE TO RELATED APPLICATION

This application claims the benefit under 35 U.S.C. §119(e) of U.S. Provisional Patent Application No. 61/023,577, filed on Jan. 25, 2008, the entire disclosure of which is hereby incorporated herein by reference.

BACKGROUND OF THE INVENTION

The present invention generally relates to lighting devices and, more particularly, relates to a lighting device that has one or more batteries as the power source.

Portable lighting devices, such as flashlights and head worn lights, generally employ a light source, such as an incandescent lamp or one or more light emitting diodes (LEDs), a reflector or other optics, and a power source typically employing one or more electrochemical cell batteries. Some portable lighting devices are adapted to be worn on the head of a user, commonly referred to as a headlamp, whereas other lighting devices may be structurally mounted to a supporting structure.

It would be desirable to provide for a portable lighting device that provides for enhanced light illumination and enhanced features for use in the field.

SUMMARY OF THE INVENTION

In accordance with one aspect of the present invention, a lighting device is provided that includes a housing and a light source provided on the housing and having a first optic. The lighting device also includes a second optic in a light illumination path of the light source to focus light illumination into a desired beam. The lighting device further includes a light transparent gel disposed between the first optic of the light source and the second optic for enhancing the efficiency of light transmission from the first optic to the second optic.

According to another aspect of the present invention, a lighting device is provided that includes a housing, a light source provided on the housing and having a first lens, and a power source for supplying power to the light source. The lighting device also includes a second lens in a light illumination path of the light source to focus light illumination into a desired beam. The lighting device further includes a light transparent medium disposed between the first lens of the light source and the second lens. The light transparent medium has an index of refraction that substantially matches an index of refraction of at least one of the first and second lenses to as to enhance the efficiency of light transmission from the first lens to the second lens.

According to yet another aspect of the present invention, an optics package is provided for a lighting device. The optics package includes a light source comprising a light emitting diode component and a first optic. The optics package also includes a second optic located near the first optic and in an optical lighting path of the light source. The optics package further includes a light transparent gel disposed between the first optic and the second optic to enhance efficiency of light transmission from the first optic to the second optic.

According to a further aspect of the present invention, a method of assembling an optics package for a lighting device is provided. The method includes the step of providing a light source comprising a light emitting diode component and a first optic lens. The method also includes the step of arranging a second optic located near the first optic and in a lighting path of the light source. The method further includes the step of disposing a light transparent gel between the first optic and the second optic to enhance efficiency of light transmission from the first optic to the second optic.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1 is a front perspective view of a lighting device, according to one embodiment of the present invention;

FIG. 2 is a front perspective view of the lighting device shown in FIG. 1;

FIG. 3 is an enlarged front perspective view of the lighting device shown in FIG. 1;

DETAILED DESCRIPTION OF THE PREFERRED EMBODIMENTS

Figure 6:
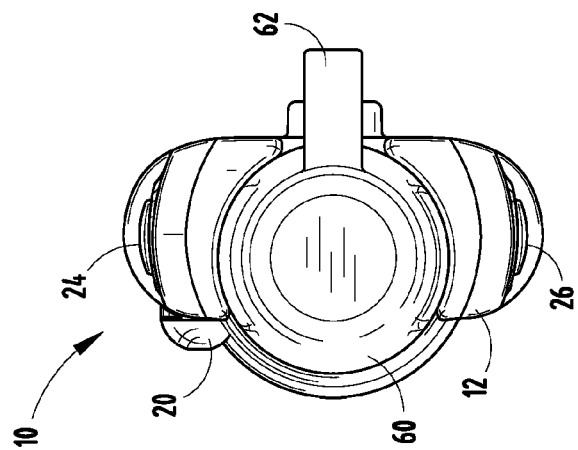
FIG. 6 is a rear view of the lighting device shown in FIG. 3.
Figure 5:
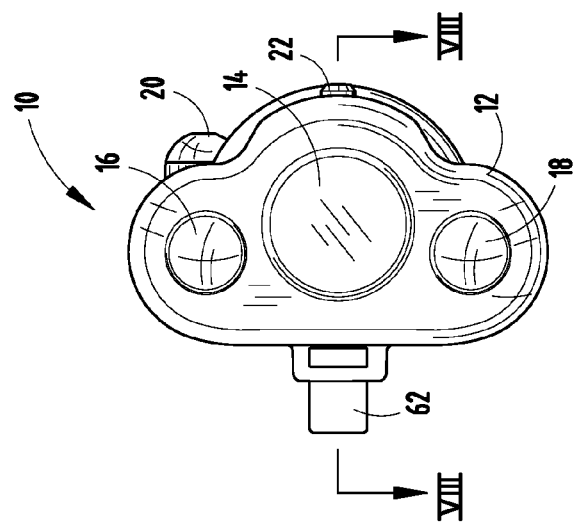
FIG. 5 is a front view of the lighting device shown in FIG. 3.
Figure 4:
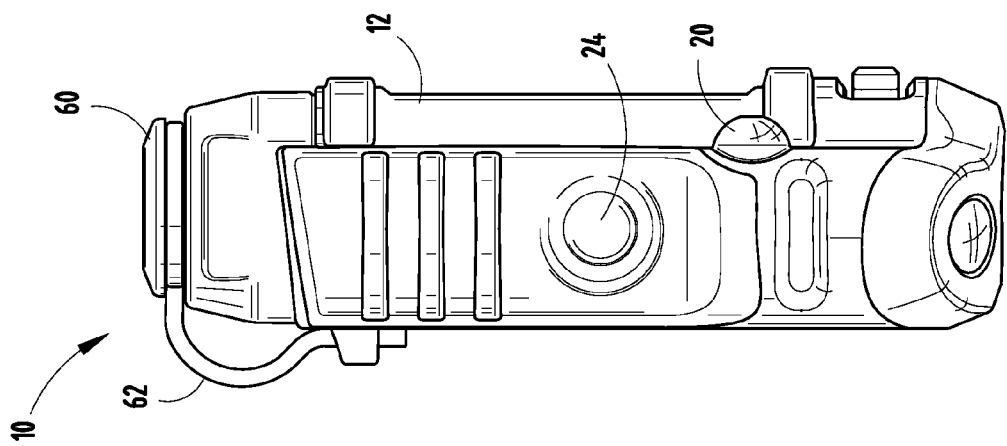
FIG. 4 is a bottom view of the lighting device shown in FIG. 3.

Before describing in detail embodiments that are in accordance with the present invention, it should be observed that the embodiments reside primarily in combinations of method steps and apparatus components related to a lighting device and method of operating thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like reference characters in the description and drawings represent like elements.

In this document, relational terms, such as first and second, top and bottom, and the like, may be used to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional elements in the process, method, article, or apparatus that comprises the element.

Referring now to FIGS. 1-6, a portable lighting device 10 is generally illustrated to provide a user with lighting, according to one embodiment of the present invention. The lighting device 10 generally includes a light body 12. The light body 12 generally includes a housing that contains the various electrical and optical components of the lighting device 10. In the disclosed embodiment, the light body 12 has four light sources, namely three forward facing light emitting diodes (LEDs) 14, 16 and 18, and one side facing LED 20. In the disclosed embodiment, the central forward facing light source 14 is implemented as a white LED, also referred to as a non-colored LED, adapted to emit a forward projecting visible beam of non-colored (white) light illumination generally in the visible light spectrum having a wavelength in the range of about 420 nanometers to 680 nanometers, according to one embodiment. Light source 16 is implemented as an infrared (IR) LED for emitting a forward projecting beam of infrared (IR) illumination in the visible or invisible IR spectrum. The IR illumination may be in the invisible IR spectrum having a wavelength generally in the range of about 680 nanometers to 1.2 micrometers, according to one embodiment. The invisible IR is generally invisible to the naked eye, but may be viewable by a person with the use of night vision equipment (e.g., night vision goggles). Light source 18 is implemented as a colored LED for emitting a forward projecting beam of visible colored light in a colored illumination beam. According to one embodiment, the colored light LED 18 is a blue LED that illuminates visible blue light generally in the visible blue light spectrum having a wavelength in the range of about 400 to 500 nanometers, according to one embodiment.

According to one embodiment, the side facing light source 20 is employed as another light source that may include white light, colored light or IR. The light source 20 may operate intermittently to provide a blinking signal, according to one embodiment.

The light body 12 is further configured with a plurality of user actuatable control switches for controlling activation and illumination of the light sources 14, 16, 18 and 20. A first push-button switch 24 is located on the top gripping portion of the light body 12 and is actuatable by a user depressing the push-button switch 24. Switch 24 controls activation and illumination intensity of the visible white light source 14. Switch 24 is depressible to turn white light source 14 on and off and may be further actuatable to control the intensity (brightness) of the visible white light illumination beam as described herein. According to one embodiment, switch 24 may be actuated repeatedly to turn on and off the light source 14 and to sequentially change intensity of the white light emitted by light source 14 among a plurality of brightness settings, including high, medium and low intensity settings. According to another embodiment, switch 24 may be further actuated by continuous depression to adjust the white light intensity at more incremental settings by ramping the white light intensity up and down.

A second push-button switch 26 is located on the bottom handle portion of the light body 12. The second push-button switch 26 is likewise actuatable by a user to control illumination of the visible colored (blue) light source 18. Switch 26 may be depressed to activate light source 18 to turn the blue light source 18 on and off and may further be actuatable to control the illumination intensity (brightness) of colored light source 18. According to one embodiment, switch 26 may be actuated repeatedly to turn the colored light source 18 on and off and to sequentially change intensity of the colored light emitted by light source 18 among a plurality of brightness settings, including high, medium and low intensity settings. According to another embodiment, switch 26 may be further actuated by continuous depression to adjust the colored light intensity at more incremental settings by ramping the colored light intensity up and down.

The light body 12 further includes a three-position toggle switch 22 shown located on a lateral side of the light body 12. According to one embodiment, the toggle switch 22 is a three-position contact switch with three states configured to limit lighting operation to one light source at a time, and to prevent activation of other light sources. Specifically, the three-position switch 22 has a first side light position that activates the lateral side facing light source 20, a second "IR" position that activates the forward facing IR light source 16, and a third "off" position that keeps the first and second light sources off and enables operation of either the colored or non-colored visible light sources 14 and 18. In the third "off" position, the three-position switch 22 enables operation of either the visible white or colored light sources 14 or 18 when the corresponding switch 24 or 26 is actuated, and prevents activation of the IR light source 16 and other light source 20. In the second IR position, the three-position switch 22 activates the forward facing IR LED 16 and prevents other light sources from being activated. In the first side light position, the three-position switch 22 activates the side facing light source 20. In this first switch position, no other light sources may be activated. Thus, the three-position switch 22 controls which light sources may be activated and which light sources are deactivated, and prevents simultaneous activation of two or more of the light source 20, IR light source 16 and visible light sources 14 or 18.

Figure 7:
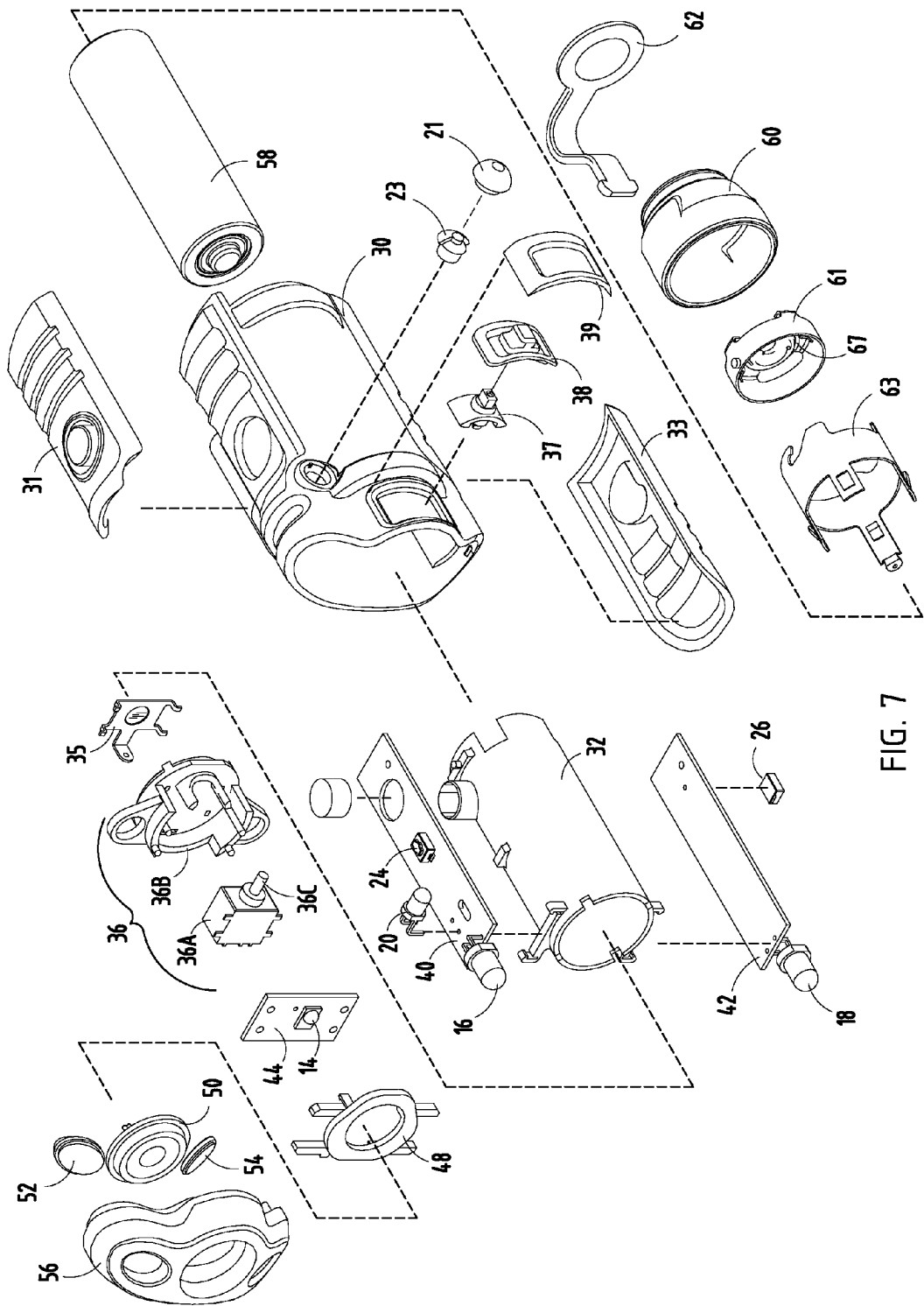
FIG. 7 is an exploded view of the light body of the lighting device shown in FIG. 3.
Figure 8:
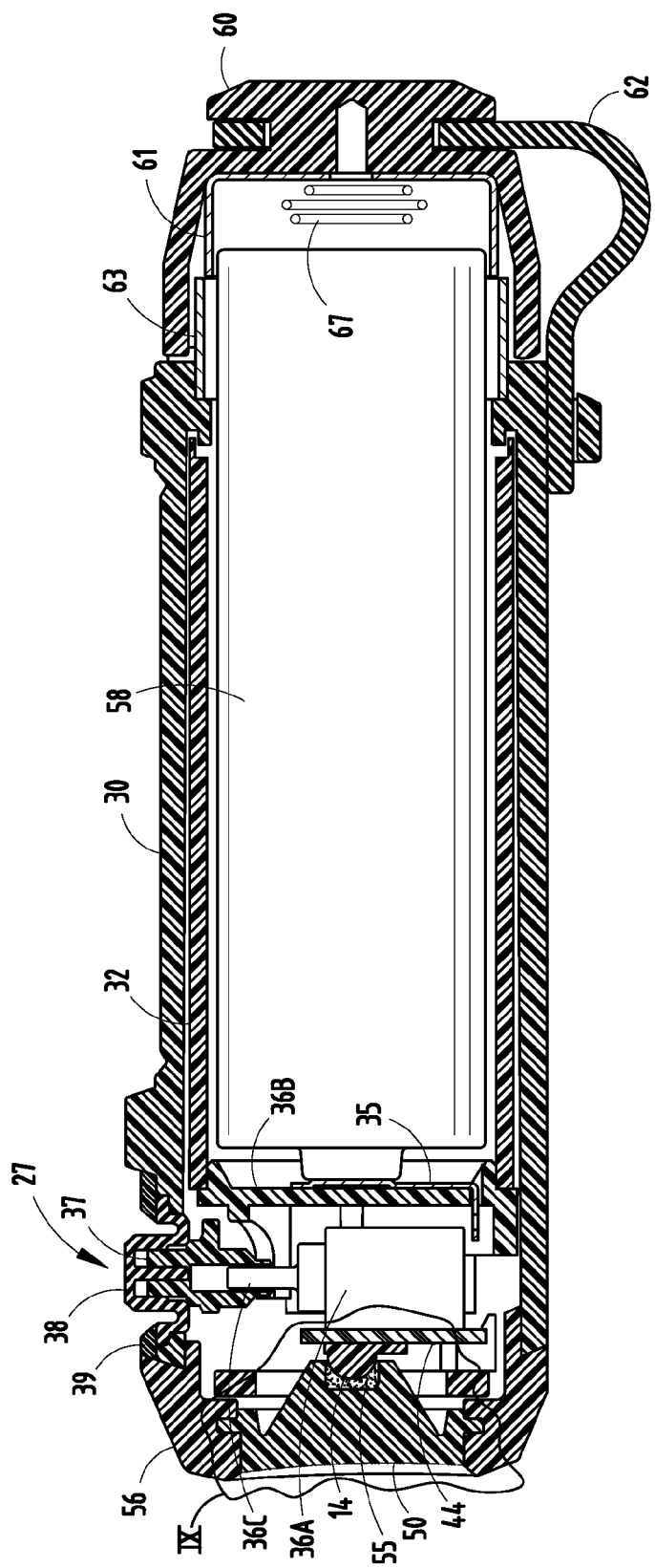
FIG. 8 is a cross-sectional view of the lighting device taken through lines VIII-VIII of FIG. 5.

Referring to FIGS. 7 and 8, the assembly of the light body 12 is further illustrated having a housing generally including a main housing body 30 with upper and lower grips 31 and 33 adhered, overmolded, or otherwise attached thereto, a front housing body 56, and a rear end cap 60. Disposed within main body housing 30 is a generally cylindrical battery compartment 32 for receiving one or more batteries 58 as the power source. In the disclosed embodiment, a single cell battery 58 is employed to provide a power source voltage of about 1.5 volts. The battery 58 serves as a power source for providing electrical power to power the light sources and control circuitry. While a single 1.5 volt battery is shown and described herein as the power source, it should be appreciated that single or plural batteries in various sizes, shapes, power and voltage configurations may be employed to provide electrical power as the power source.

The rear end cap 60 threadingly engages the rear end of main housing body 30 and serves as a removable cover that may be twisted on and off to allow replacement of the battery 58. The end cap 60 generally includes electrical contacts 61 and 63 that are disposed in the interior of end cap 60 to provide contact with battery 58 and electrical current paths.

Contact 61 has a spring 67 as should be evident to those in the art to spring bias the battery 58 into contact with electrical contacts 35 and 61 at opposite end terminals of the battery 58. Additionally, the end cap 60 is connected to an end loop of a tether 62 which, in turn, is connected to the main body 30 of light body 12. The tether 62 may be flexible such that it bends and may slide within a holder on the main body 30. The tether 62 serves to retain the end cap 60 attached to the light body 12 during removal of the end cap 60 from housing body 30 to allow for insertion and removal of a battery 58 without misplacing the end cap 60. It should be appreciated that a gasket may be disposed between end cap 60 and housing body 30 to facilitate a watertight closure.

The light body 12 further includes one or more circuit boards which may be implemented as LED printed circuit boards having circuit components including one or more LEDs, switches and electrical circuit traces and contacts formed thereon for providing control circuitry and electrical circuit connections. In the embodiment shown, three circuit boards 40, 42 and 44 are shown disposed within the main housing body 30. The first circuit board 40 is shown having circuit contacts of switch 24 connected thereto. Additionally, IR light source 16 is connected to the first circuit board 40 at the forward end. Electrical circuit traces are provided on the first circuit board 40 to allow switch 24 and control circuitry to control activation of IR light source 16. According to one embodiment, the IR LED 16 may include Part No. GB-IR224B3 IC-015, commercially available from Globe Technology Component.

Additionally, the side facing light source 20 is also shown connected to the first circuit board 40. The electrical circuitry provided on the circuit board 40 also allows activation of the light source 20. The light source 20 extends through an opening in the side of the main housing body 30 aligned behind optical lens 23 and protective cover 21. Illumination of the light source 20 provides a spot indicator at lens cover 21 that is viewable at the side.

The second circuit board 42 has circuit contacts of switch 26 connected thereto. Additionally, colored light source 18 is connected to circuit board 42 at the forward end. Circuit board 42 likewise has electrical circuitry, such as circuit traces, coupling switch 26 and control circuitry to colored light source 18 to allow control thereof. The first and second circuit boards 40 and 42 are generally shown arranged parallel to one another and disposed on opposite upper and lower outer sides of the battery compartment 32. According to one embodiment, the colored blue LED 18 may include Part No. GB-333B473C-032, commercially available from Globe Technology Component.

The third circuit board 44 is located at the forward end of housing body 30 and is arranged orthogonal to first and second circuit boards 40 and 42. The main white LED 14 is mounted to the front facing side of circuit board 44. The circuit board 44 likewise has electrical circuitry, such as circuit traces, provided thereon to supply power to the white LED 14 and allow activation of the white LED 14. According to one embodiment, the main white LED 14 may include Luxeon® Rebel having Part No. LXML-PWC1-0100, commercially available from Philips Lumiled.

The white LED 14 generally provides a higher light intensity output than the other light sources 16, 18 and 20. According to one embodiment, the white LED 14 may typically be driven at a current of approximately 120 milliamps to achieve about 40 lumens of light illumination, whereas the colored LED 18 and side light LED 20 may typically be driven at approximately 30 milliamps to achieve approximately 10 lumens of light illumination for each light source, and the IR LED 16 may be driven at approximately 30 milliamps to achieve about 0.02 watts of optical power. It should be appreciated that the white LED 14 thereby serves as the main light source for providing the greatest amount of illumination. However, it should be appreciated that the amount of illumination achieved with each of the lighting sources 14, 16, 18 and 20 may be varied according to other embodiments.

Disposed adjacent to the backside of circuit board 44 is the three-position toggle switch 36. Switch 36 generally includes PCB IR switch box 36A assembled to an electronics frame 36B. The toggle switch 36 has a toggle arm or pin 36C that extends from switch box 36A through a switch opening in the main housing body 30 and is assembled to an actuator member 37. Actuator member 37, in turn, fits within and engages an overlaying rubber boot 38 that flexes when switch 36 is actuated and provides a water tight seal to close the switch opening in the main housing body 30. A fascia cover 39 lays over the top perimeter of the rubber boot 38. In one embodiment, the three-position switch 36 is actuated by applying lateral force to slide toggle member 37 and pin 36C into one of three contact positions. According to another embodiment, the three-position switch 36 is actuated by first depressing the toggle member 37 by pushing downward on boot 38 and actuator member 37 and then applying lateral force to slide or rotate the switch 36 into one of three contact positions.

Figure 9:
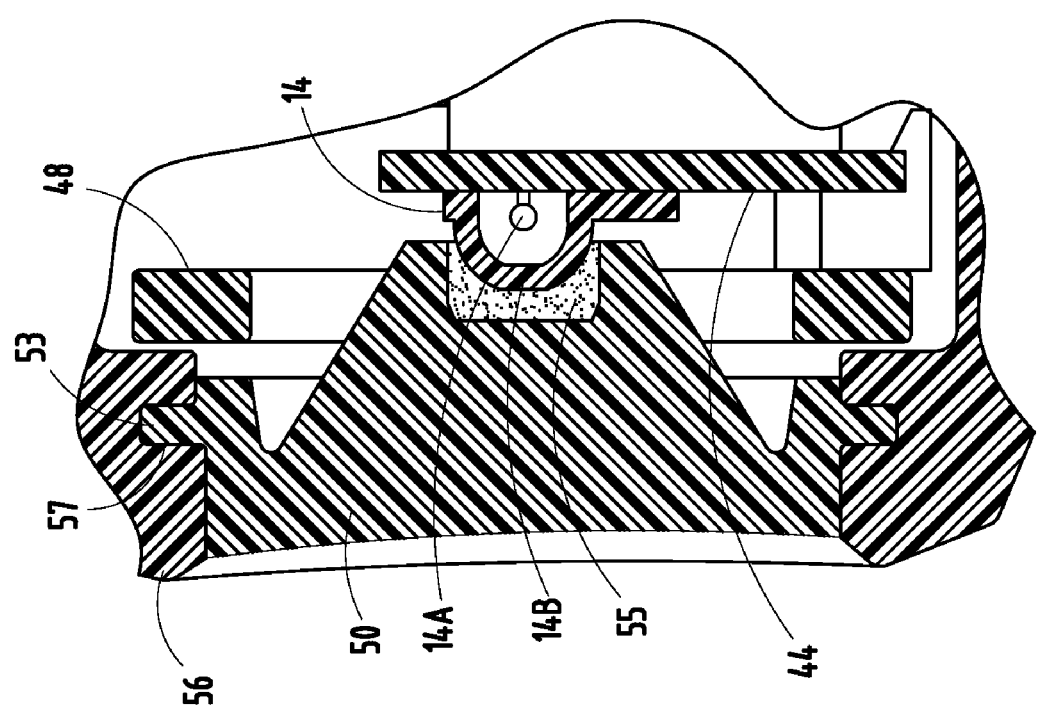
FIG. 9 is an enlarged cross-sectional view of section IX taken from FIG. 8 further showing the optics pack.

Disposed in front of the forward facing light sources 14, 16 and 18, are optics shown and described herein in the present embodiment as lenses for focusing each of the corresponding forward directed light beams in a desired beam pattern. A total internal reflectance (TIR) optical lens 50 is disposed in front of the main white LED 14. The TIR lens 50 may be made of a thermoplastic and transparent plastic, also referred to as acrylic glass. One example of a suitable acrylic glass is polymethyl methacrylate (PMMA). In an exemplary embodiment, the TIR lens 50 may include a TIR Rebel lens with an O-ring that may be injection molded. Lens 50 is shown in FIGS. 8 and 9 disposed in the front housing body 56 by way of a collar 53 trapped within channel 57. Thus, the optical lens 50 is disposed in front of the white LED 14 and is spaced therefrom by a distance. The TIR lens 50 is generally conical or frustoconical (in the shape of a frustum of a cone) with a recess provided at the vertex end for receiving the LED 14. TIR lens 50 internally reflects and collimates light and transmits the light into a desired collimated beam pattern. In one exemplary embodiment, the TIR lens 50 has a maximum diameter of twelve millimeters (12 mm) and achieves an efficiency of at least eighty-eight (88) percent. In a specific embodiment, fifty (50) percent of light generated by LED 14 is transmitted by TIR lens 50 within a window of ±thirteen (13) degrees.

The white LED 14 is generally configured as an LED package that includes a powered LED component 14A and a first or primary optic shown and described herein in the present embodiment as lens 14B. The primary optic lens 14B may include a silicone lens that provides an optical path for light generated by LED component 14A to pass forward in a desired beam pattern. Disposed between the first or primary optic lens 14B and the lens 50, also referred to herein as the second or secondary optic lens, is a light transparent medium, in the form of a gel 55. The light transparent gel 55 is disposed between the primary optic lens 14B and the secondary optic lens 50 to enhance or optimize the efficiency of the light transmission between the two lenses 14B and 50.

The lighting device 10 employs an optics package having the light transparent gel 55 disposed between a first optic of the light source and a second optic. In the disclosed embodiment, each of the first and second optics is a lens, and more specifically, the first optic is lens 14B and the second optic is lens 50. However, it should be appreciated that each of the first and second optics may include a lens, a prism, or a mirror, according to various embodiments. An optic is defined as a device that converges or diverges transmitted light so as to focus or spread the light rays. A lens is defined as a transparent optic device that typically has at least one curved surface that refracts light rays so that they converge or diverge so as to focus or spread the light rays that pass therethrough.

The light transparent gel 55 may include a transparent silicone, according to one embodiment. According to one example, the silicone may be a silicone adhesive, such as Part No. OE-6450, commercially available from Dow Corning. In this example, the silicone adhesive may have a thickness of about 1 millimeter and may not be hardened such that it does not set and remains in a gel state. The transparent gel 55 may be applied as a gel encapsulant for the LED package. It should be appreciated that the LED component 14A and its primary optic lens 14B together with the secondary optic lens 50 and the light transparent gel 55 provides for an optics package for the lighting device 10. According to a further embodiment, a light transparent gel 55 may be disposed between the LED component 14A and primary optic lens 14B to enhance light transmission therebetween.

According to one example, the first or primary optic lens 14B has an index of refraction of approximately 1.6, the second or secondary optic lens 50 has an index of refraction of about 1.5, and any unoccupied area filled with air has an index of refraction of about 1.0. The light transparent gel 55 has an index of refraction that substantially matches the index of refraction of at least one of the primary optic lens 14B and the secondary optic lens 50. According to an exemplary embodiment, the light transparent gel 55 has an index of refraction of about 1.54. More generally, the light transparent gel 50 has an index of refraction generally greater than 1.0, such as 1.1 or greater and has an index of refraction generally between the index of refraction of the primary and secondary optic lenses 14B and 50. According to one embodiment, the light transparent gel 55 has an index of refraction between 1.0 and 2.0.

By enhancing the index of refraction in the region between the primary optic lens 14B and the secondary optic lens 50, losses that would otherwise occur at the interface between each of the primary and secondary optic lenses 14B and 50 and an otherwise open air gap are eliminated such that the light illumination is more efficiently transmitted from the primary optic lens 14B to the secondary optic lens 50. The light transparent gel 55 reduces variations in index of refraction from the primary optic lens 14B to the secondary optic lens 50 so as to reduce interface loses that would otherwise occur due to larger index of refraction mismatches.

The light transparent gel 55 may be injected as a fluidous gel to completely fill the void region between the primary lens 14B and secondary lens 50 to substantially eliminate open air gaps so as to maintain a substantially matched index of refraction at the interface regions of the primary and secondary optic lenses 14B and 50. The light transparent gel 55 may be applied as a gel, such as a liquid that flows into the region between the primary optic lens 14B and the secondary optic lens 50. Subsequently, the light transparent gel 55 may be at least partially cured, according to one embodiment. The use of a light transparent gel 55 enables the air gap to be substantially filled in such that the gel 55 is conformal to the surface contour of the primary and secondary optic lenses 14B and 50. Additionally, it should be appreciated that the light transparent gel 55 may include a colored die that may provide color to the light illumination.

Disposed in front of IR light source 16 is an IR optic lens 52. The infrared lens may include Part No. 0.1*, commercially available from Fresnel Technologies, Inc. The IR lens 52 may include a fresnel lens for collimating the infrared radiation into a desired beam pattern. Similarly, disposed in front of the colored blue light source 18 is a blue optical lens 54. The blue colored optic lens 54 may include a fresnel lens having Part No. 0.1*, commercially available from Fresnel Technologies, Inc. The blue optic lens 54 may include a fresnel lens for collimating the colored blue light into a desired beam pattern. According to various embodiments, the optic lenses 52 and 54 may be conical TIR lenses, fresnel lenses or other optics. It should further be appreciated that a light transparent gel 55 may also be disposed between LED 16 and optic lens 52, as well as between LED 18 and optic lens 54, according to further embodiments to further enhance the light transmission therebetween. Lenses 50, 52 and 54 are generally positioned in corresponding openings provided in the front facing portion of front housing body 56.

Additionally, a thermally conductive member 48 generally receives the TIR lens 50 and abuts the inner surface of the front housing body 56. Thermally conductive member 48 is made of a thermally conductive material that acts as a heat sink to dissipate thermal energy (heat) away from the white LED 14. Heat sink 48 also dissipates thermal energy away from LEDs 16 and 18. By dissipating thermal energy away from the light sources 14, 16 and 18, enhanced performance of the lighting sources may be realized.

The housing of light body 12 which generally includes the main housing body 30 with upper and lower grips 31 and 33, the front housing body 56, and the rear end cap 60 is generally made up of an impact resistant material capable of withstanding adverse use in the field. According to one embodiment, the housing may be made up of a thermoplastic such as acrylonitride-butadiene-styrene (ABS). According to a second embodiment, the material may be made up of a nylon-ABS blend, which offers a good combination of stiffness and toughness. Examples of a nylon-ABS blend include Nylon 66/6 which is a copolymer offering dimensional stability and good impact resistance. Examples of a nylon-ABS blend include Lumid® Hi-5006 A, commercially available from LG Chemical Ltd., Excelloy AK15 (DRIE), commercially available from Techno Polymer America, Inc., and Toyolac® SX01, commercially available from Toray Resin Company. According to other embodiments, the housing of light body 12 may be made of a nylon, such as an impact modified and/or glass filled nylon, with the elastomer blended into the nylon for optimal toughness. A further embodiment of the housing material may include a polycarbonate.

The components of the housing and other components connected thereto may be held in place with an adhesive, according to one embodiment. The adhesive may include adhesives from the following families: cyanoacrylites, epoxies and urethanes. It should be appreciated that the aforementioned adhesives are commercially available under the brand name Loctite® from Henkel Corporation. According to another embodiment, the components of the housing and other components connected thereto may be held together via ultrasonic welding.

The lighting device 10 may be employed as a portable handheld lighting device, according to one embodiment. According to other embodiments, the lighting device 10 may be connected to a supporting structure, such as an article of clothing (e.g., hat). To accommodate mounting to a support structure, the lighting device may include a connecting structure (not shown).

Figure 10:
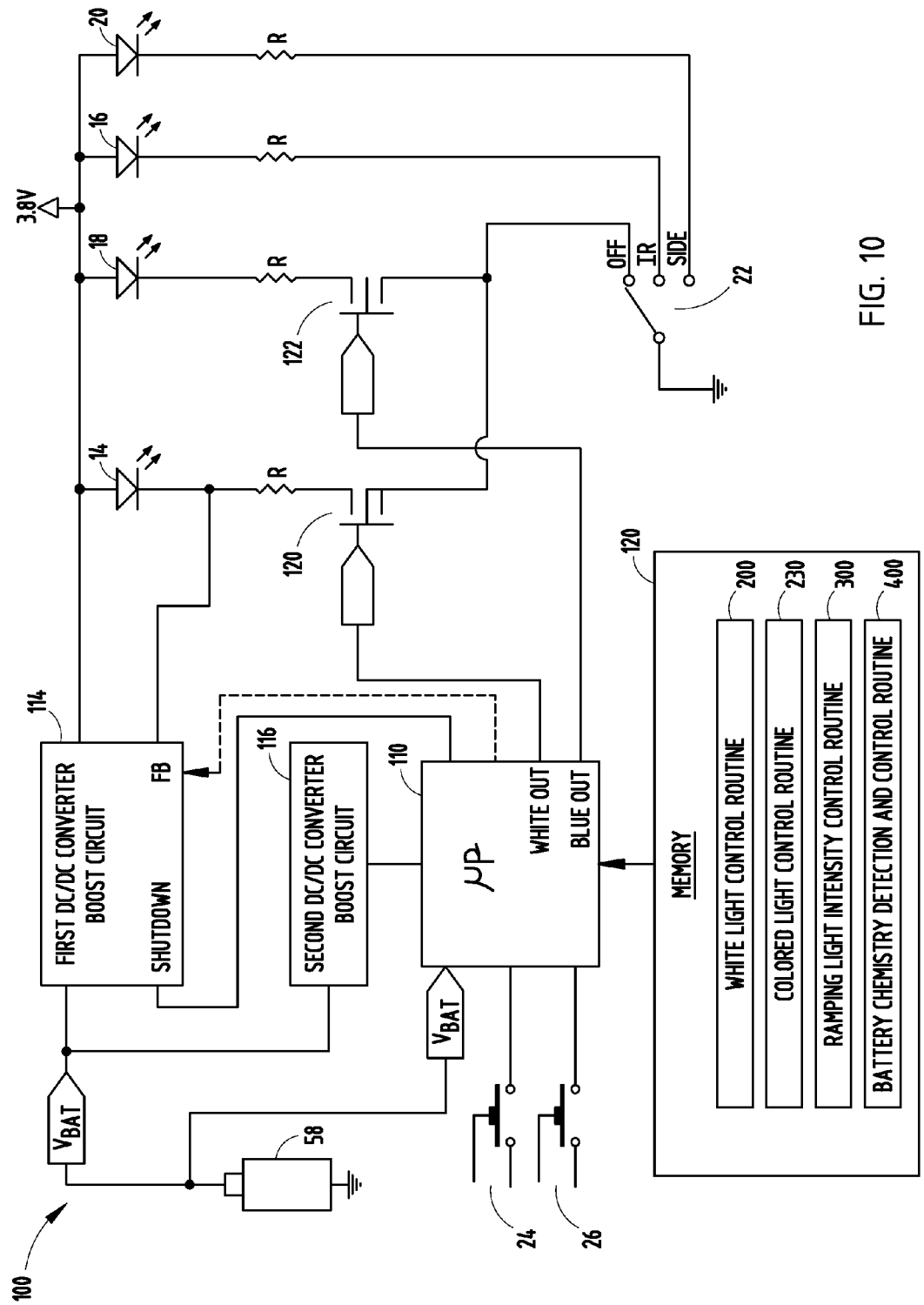
FIG. 10 is a block/circuit diagram illustrating control circuitry for controlling operation of the lighting device, according to one embodiment.

The lighting device 10 includes control circuitry 100 for controlling operation of the light sources 14, 16, 18 and 20. The control circuitry 100 is generally illustrated in FIG. 10, and specific control circuitry is further illustrated in FIGS. 11A-13 according to various disclosed embodiments. As seen in FIG. 10, the control circuitry 100 includes a microprocessor 110 coupled to memory 112. The microprocessor 112 may include any signal processing device capable of processing switch inputs, executing routines, and generating control signals as described herein. Memory 112 may include volatile and nonvolatile memory devices, such as electronically erasable programmable read-only memory (EEPROM), flash memory, or other known memory devices. Stored within memory 112 are a plurality of routines including a visible white light control routine 200 for controlling activation and intensity of the visible white light source 14, a colored light control routine 230 for controlling activation and intensity of the colored light source 18, a battery chemistry detection and control routine 400 for detecting the type of electrochemical cell battery employed and controlling the lighting device 10 based on the detected type of cell employed, and a ramping light intensity control routine 300 for controlling illumination intensity of either of the white and colored light sources 14 and 18 in a cyclical ramping mode, according to one embodiment.

The control circuitry 100 further includes boost control circuitry for supplying a substantially constant current or substantially constant voltage to one or more of the light sources 14, 16, 18 and 20, which are shown as light emitting diodes, and are generally connected to the three-position switch 22. In certain disclosed embodiments, the boost circuitry includes a first DC/DC converter boost control circuit 114 generally coupled to the LEDs 14, 16, 18 and 20 for controlling power supplied to the LEDs. In certain embodiments, the boost control circuit 100 further includes second DC/DC converter boost control circuitry 116 that controls power supplied to the microprocessor 110. In such embodiments, the first boost control circuitry 114 may be turned off such that no power is supplied to the light sources when all light sources of the lighting device 10 are turned off, whereas power may be supplied periodically or continuously to the microprocessor 110 by way of the second boost circuit 116. The first and second boost circuits 14 and 16 receive power from the battery 58 at a voltage potential $V_{BAT}$. In the disclosed single battery cell embodiment, $V_{BAT}$ is about 1.5 volts. However, $V_{BAT}$ may drop to about 1.0 volts or less as the battery is depleted and still operate the light. Additionally, the voltage $V_{BAT}$ is supplied to the microprocessor 110. The microprocessor 110 also receives inputs from each of the visible white light switch 24 and the colored light switch 26.

The microprocessor 110 processes the inputs from switches 24 and 26 and executes routines 200, 230, 300 and 400 stored in memory 112 and controls the activation and intensity of the visible white and blue light sources 14 and 18, whenever the three-position switch 22 is in the off position. The first boost control circuit 114 supplies a boost rail voltage of 3.8 volts that serves to power LEDs 14, 16, 18 and 20. According to one embodiment, the microprocessor 110 provides a pulse width modulated (PWM) output signal to each of the transistors (e.g., MOSFETs) 120 and 122 to control current flow through LEDs 14 and 18, and thus the activation and intensity of the visible light emitted by the visible light sources 14 and 18. Alternately, the microprocessor 110 could provide a pulse width modulated (PWM) output signal to the first DC/DC converter boost circuit 114 shutdown input to control the intensity of the light emitted by the visible light sources 14 and 18, while MOSFETs 120 and 122 are used to control which light sources 14 and/or 18 are receiving power. Thus, when the microprocessor 110 outputs a signal on either of MOSFETs (transistors) 120 and 122, and the three-position switch 22 is in the "off" position, power is supplied to the corresponding light source 14 or 18 at a light intensity determined by the microprocessor 110, which generally is in response to activation of the respective user input actuation of switches 24 or 26. The microprocessor generated outputs for controlling light intensity for a light source may be output at a predetermined number of levels, such as a high, medium and low intensity, or may be continuously ramped up and down, according to two disclosed embodiments.

When the three-position switch 22 is actuated into the "IR" position, electrical current is supplied through the IR light source 16 and a resistor R and to ground to operate light source 16, and no other light sources are operable in that position of switch 22. When switch 22 is actuated into the "side" position, electrical current is supplied through the side LED 20 and resistor R and to ground to operate the light source 20, and no other light sources are operable in that position. Thus, the three-position switch 22 thereby ensures that the side light mode, IR mode and visible light modes cannot operate at the same time.

Figure 11A:
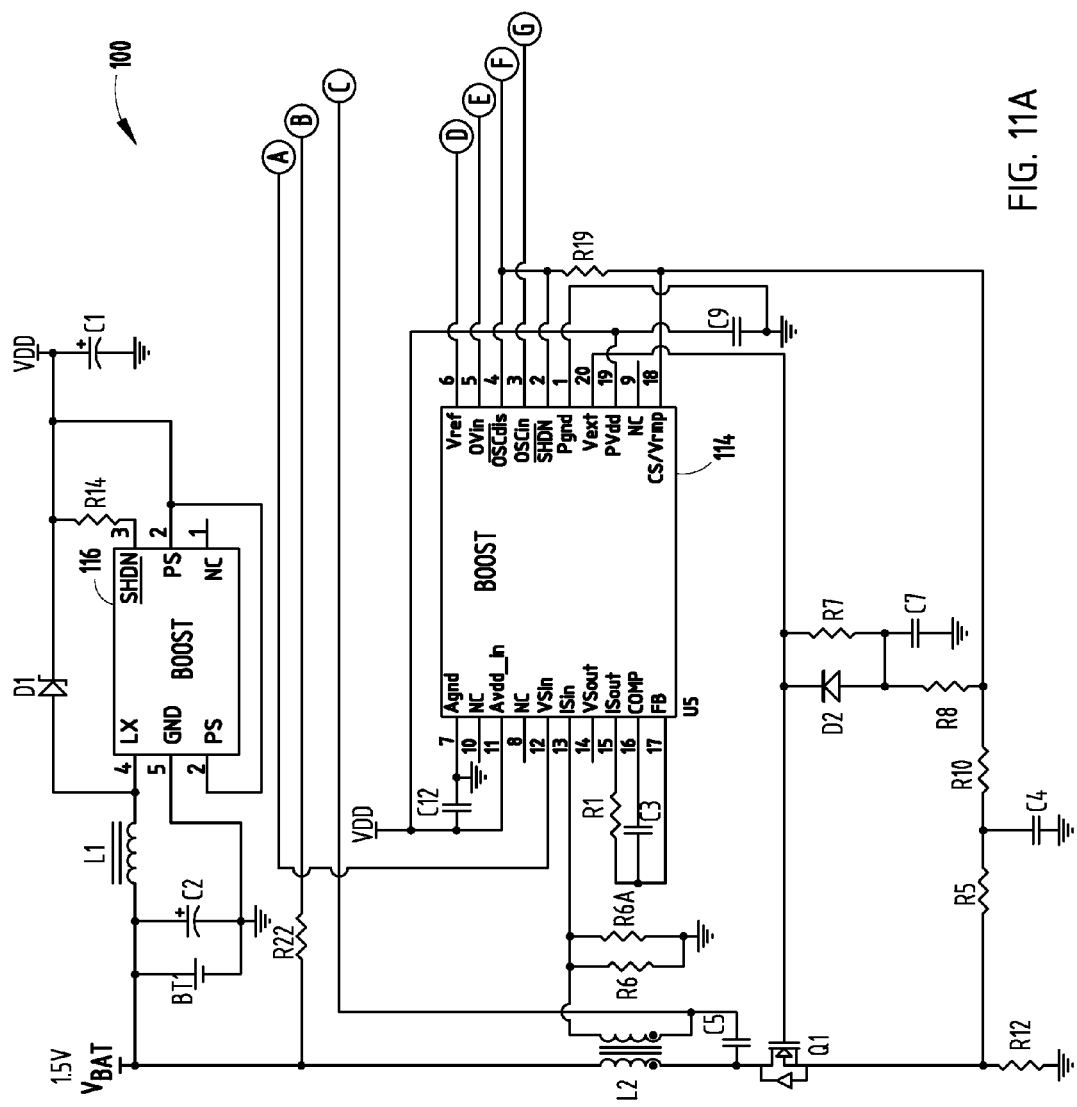
FIGS. 11A and 11B are a circuit diagram showing implementation of the control circuitry, according to a first embodiment.
Figure 11B:
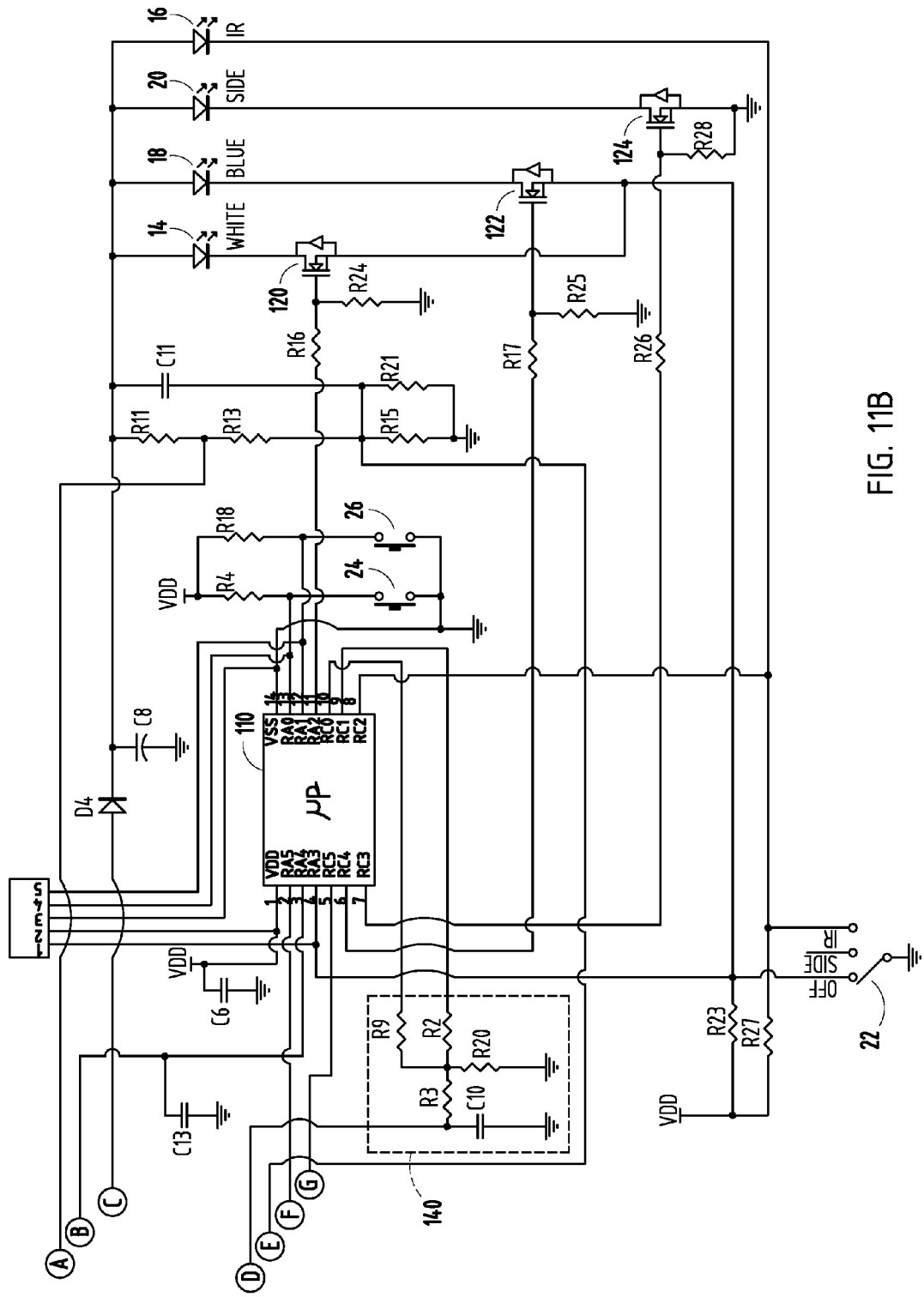

Referring to FIGS. 11A and 11B, one example of the boost control circuitry 100 is illustrated providing a substantially constant current to the lighting sources according to a first boost circuit embodiment. The control circuitry 100 is shown having a microprocessor 110 providing output control signals to transistors 120 and 122 to control activation and light intensity of the main white LED 14 and colored LED 18. Transistor 124 is used to control the blinking of the side LED 20. The IR LED 16 is controlled in response to switch 22 actuated into the IR position to complete the rail voltage to ground connection through IR LED 16. The position of switch 22 is detected by microprocessor 110 sensing that switch 22 is not in either of the off or IR positions. The microprocessor 110 is connected to a resistor network 140 on pin RC0 that also connects to the $V_{ref}$ input of the main boost circuit 114 at pin 6. The main boost circuit 114 thereby provides one or more output levels based on the state of the microprocessor 110 output on pin RC0. This allows the microcontroller 110 to control the output level of the main boost circuit 114 by means of software routines. This output level may be changed based on the detected battery chemistry presented to the microprocessor 110 at pin 3 labeled RA4.

The battery voltage $V_{BAT}$, supplied at 1.5 volts according to one embodiment, is supplied to inductors L1 and L2. Inductor L2 is a mutually coupled inductor which supplies a substantially constant current through diode D4 on the rail that powers light sources 14, 16, 18 and 20. Inductor L2 with first boost circuit 114 thereby provides electrical energy at a substantially constant current to the rail. A transistor Q1 serves as a main power switch for the first boost circuit 114. It should be appreciated that resistors R11, R13, R15 and R21 and capacitor C11 provide a voltage divider to monitor for over voltage which is sensed at pin 5 of the main boost converter 114.

The second boost circuitry 116 is generally coupled to inductor L1 which steps up the battery supplied voltage from 1.5 volts to about 3.0 or 3.3 volts to serve as voltage $V_{DD}$. The second boost circuit 116 serves as a boost for the voltage $V_{DD}$ and provides stable operating voltage and/or power to the microprocessor 110.

The three-position switch 22 allows for switching amongst the visible, IR and side light positions. The three-position switch 22 also serves as a return path to ground for electrical current for both the visible white and blue LEDs 14 and 18. The IR LED 16 also passes current to ground when switch 22 is in the IR position.

Figure 12:
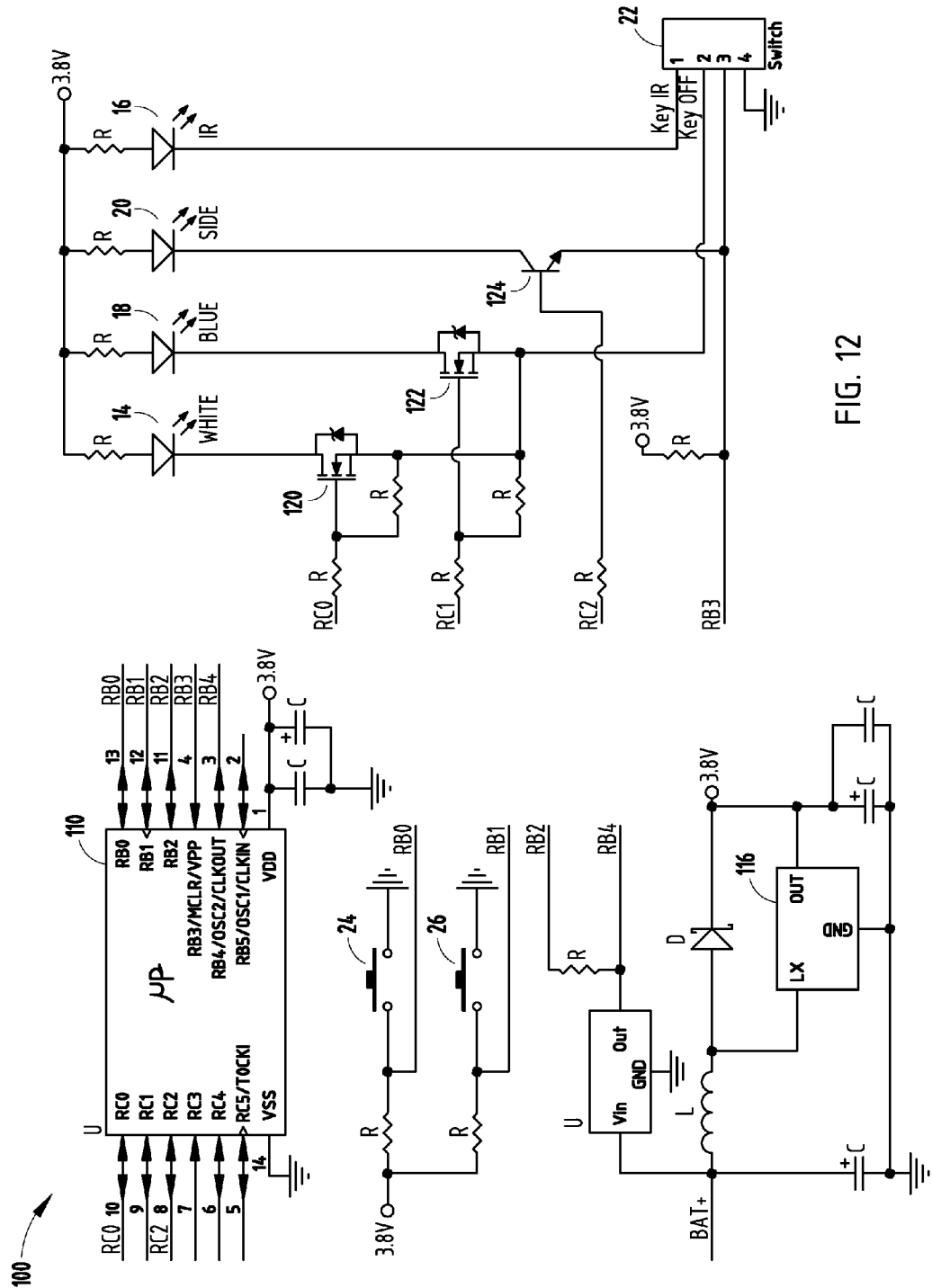
FIG. 12 is a circuit diagram illustrating implementation of the control circuitry, according to an alternate second embodiment.

Referring to FIG. 12, an alternate second control circuit 100 is shown providing a substantially constant voltage to the light sources 14, 16, 18 and 20. In this second embodiment, a single boost circuit configuration is employed. The control circuitry 100 generally illustrated in FIG. 12 includes microprocessor 110 having outputs coupled to transistors 120, 122, 124 for controlling white light LED 14, colored LED 18 and side LED 20, respectively. The microprocessor 110 receives as inputs signals from switches 24 and 26 on lines RB0 and RB1 which are generated in response to user activation.

Control circuitry 100 includes a single boost circuit 116 in FIG. 12 for providing a rail voltage of 3.8 volts that serves as a substantially constant voltage supply of 3.8 volts for powering light sources 14, 16, 18 and 20. Additionally, the boosted 3.8 volts is used to power the microprocessor 110. The single boost circuitry 116 generally includes an inductor L coupled to the battery which supplies the voltage of about 1.5 volts. The voltage of 1.5 volts is stepped up by inductor L to 3.8 volts and serves as the rail voltage. Coupled between the rail supplying 3.8 volts and each of the light sources 14, 16, 18 and 20 are resistors R that serve as current limiting resistors. With the three-position switch 22 in the IR position, current flows from the rail of 3.8 volts through IR LED 16 and then to ground through the three-position switch 22, which is shown having four terminals, with one terminal connected to ground. With the three-position switch 22 in the side light position, current flows from the rail voltage of 3.8 volts through the side LED 20 as controlled by transistor 124 to ground through the switch 22. With the three-position switch 22 in the off position, current may flow through either LED 14 or LED 18 from the 3.8 volt rail to ground as controlled by transistors 120 and 122.

Thus, the second embodiment of the control circuitry 100 allows for the use of a single boost circuit to supply a substantially constant rail voltage for supplying electrical power to the light sources 14, 16, 18 and 20. In order to make efficient use of the battery power source 58, it should be appreciated that the boost circuit and other control circuitry may be periodically powered on and off to operate in a wake up mode so that electrical current is not continually transmitted through circuitry to drain the battery power source 58.

Figure 13:
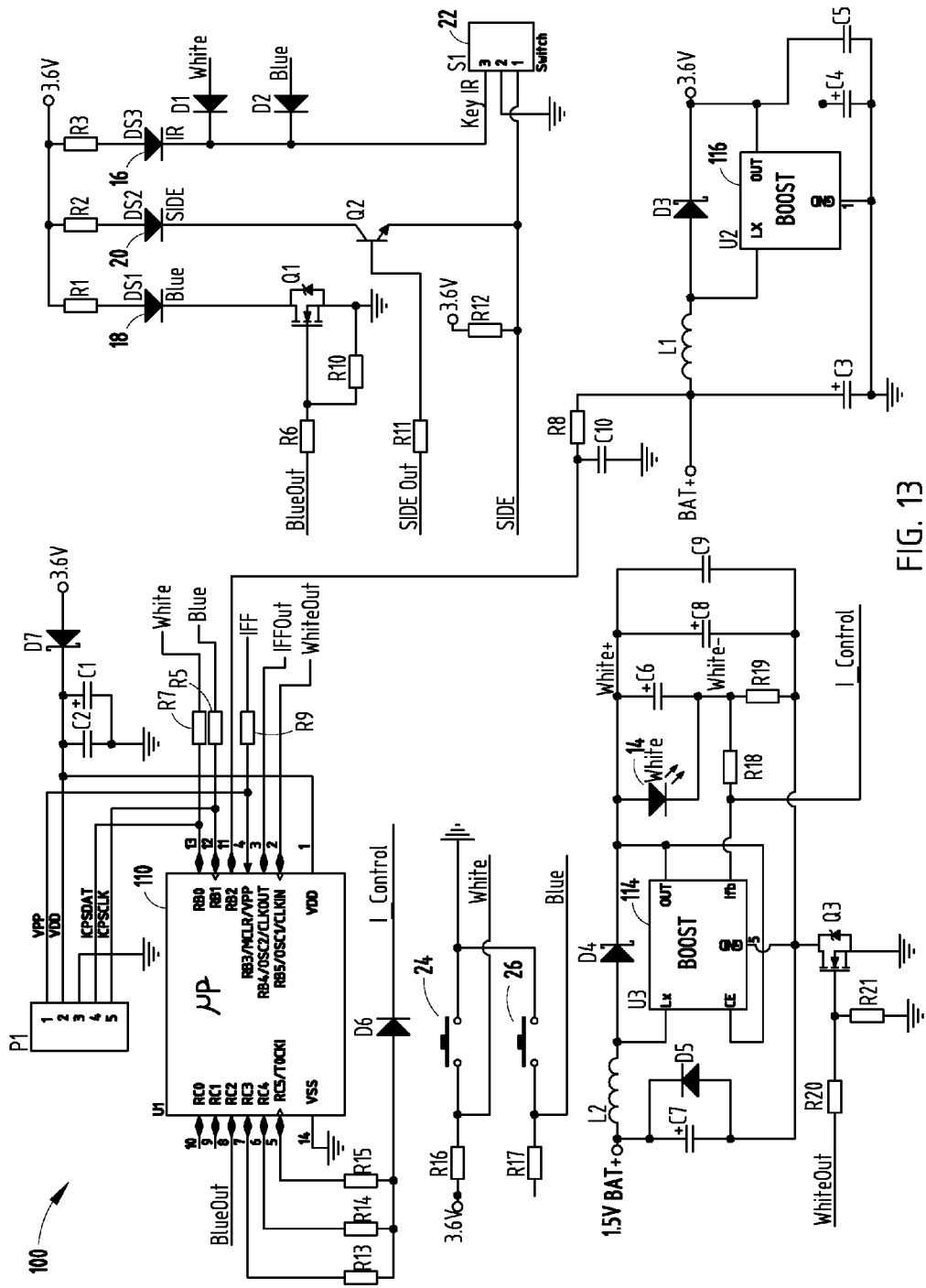
FIG. 13 is a circuit diagram illustrating implementation of the control circuitry, according to a third embodiment.

Referring to FIG. 13, the control circuitry 100 is shown according to a third embodiment employing first and second boost circuitry 114 and 116. The control circuitry 100 shown in FIG. 13 employs microprocessor 110, and first and second boost circuits 114 and 116 to provide for another double boost circuit embodiment. In this embodiment, the first boost circuit 114 serves as a current regulator to provide a substantially constant current to the white LED 14, using pulsed frequency modulation (PFM). Thus, the boost circuitry 114 provides current regulation which is generally achieved by the use of inductor L2 to power the highest intensity LED 14. With the three-position switch 22 in the off position, the white LED 14 is activated by switch 24 and transistor Q3 is used to turn off the white LED 14.

The pulsed frequency modulation (PFM) provided by the first boost circuitry 114 is used to control activation and intensity of the white LED 14. Thus, by pulsing the frequency modulation of the signal, the intensity of the white LED 14 may be adjusted to achieve a desired brightness in response to activation of the corresponding user actuatable switch 24. While pulsed frequency modulation is disclosed in this embodiment, it should be appreciated that other forms of intensity control, such as pulse width modulation (PWM) may be employed to control intensity of one or more of the lighting sources 14, 16, 18 and 20.

The second boost circuit 116 is shown coupled to the battery voltage of 1.5 volts and inductor L1 to provide a 3.6 voltage rail which is supplied to LEDs 16, 18 and 20. The second boost circuit 116 regulates the current provided to the colored LED 18, side LED 20 and IR LED 16. Thus, the second boost circuit 116 provides a rail voltage of 3.6 volts and regulates the current provided to the three LEDs 16, 18 and 20 connected to the rail voltage. The three-position switch 22 is shown providing an IR position for controlling activation of the IR LED 16 by allowing current to flow from the 3.6 volt rail through resistor R3 and LED 16 to ground. In the side light position of three-position switch 22, current flows from the 3.6 volt rail through resistor R2, ILED 20, and transistor Q2 to ground. With the three-position switch 22 in the off position, the blue LED 18 may be controlled by way of transistor Q1. The control circuitry 100 is shown powered by a battery supplying 1.5 volts, however, it should be appreciated that control circuitry 100 can operate at various other voltage potentials, such as 3.0 volts supplied by two battery cells connected in series.

Figure 14:
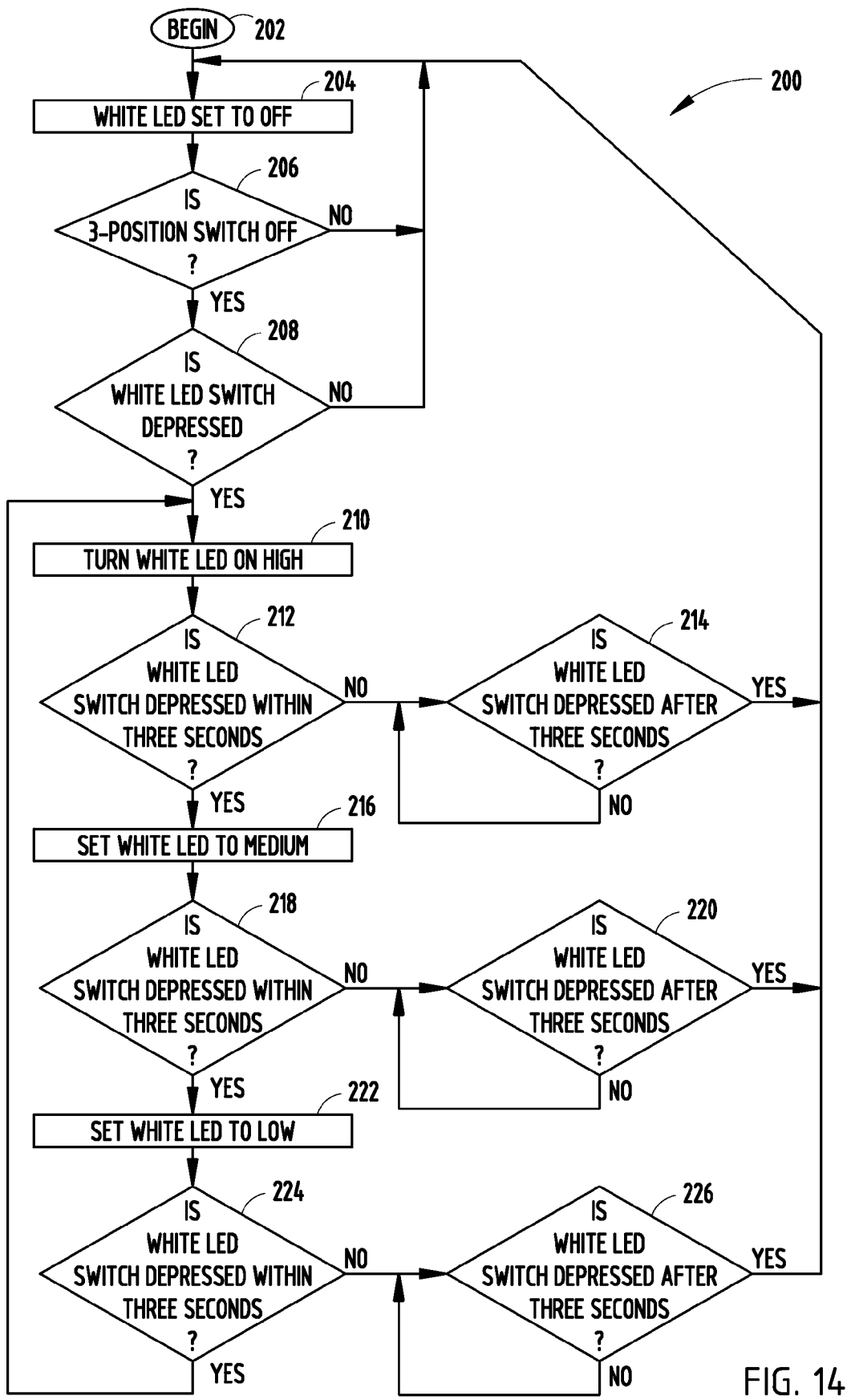
FIG. 14 is a flow diagram illustrating a routine for controlling the non-colored white LED, according to one embodiment.

Referring to FIG. 14, the white light control routine 200 is illustrated for controlling the operation of the visible white light source 14 to activate and deactivate the light source 14 and to further provide three available light intensities. Routine 200 begins at step 202 and proceeds to set the white LED to the off state. Next, in decision step 206, routine 200 determines if the three-position switch 22 is set to the off position and, if not, prevents activation of the visible white light source and returns to step 204. If the three-position switch is set to the off position, routine 200 proceeds to step 208 to determine if the white LED switch 24 is depressed and, if so, turns the white LED on at a high intensity level in step 210, preferably setting the white LED at the highest intensity level. Accordingly, the white LED, when turned on, is turned on at the highest intensity setting.

With the white LED set to the high intensity level, routine 200 proceeds to decision step 212 to determine if the white LED switch has been depressed within three seconds of turning the white LED on high and, if so, proceeds to step 216 to set the white LED to the next lowest intensity setting which, in one embodiment, is the medium intensity setting. If the white LED switch has not been depressed within the three second time period, routine 200 proceeds to decision step 214 to determine if the white LED switch is depressed after the three second time period and, if so, returns to step 204 to turn the white LED off. However, if the white LED switch is not depressed after three seconds, the white LED remains in the high intensity state.

With the white LED set to the medium intensity setting, routine 200 proceeds to step 218 to determine if the white LED switch is depressed within a three second time period of setting the white LED to the medium setting and, if so, sets the white LED to the next lowest intensity setting in step 222 which, in this embodiment, is the lowest intensity setting. If the white LED switch has not been depressed within the three second time period, routine 200 proceeds to step 220 to determine if the white LED switch is depressed after the three second time period and, if so, returns to step 204 to turn the white LED off. Otherwise, the white LED remains on at the medium intensity setting.

With the white LED set to the low intensity setting, routine 200 proceeds to step 224 to determine if the white LED switch has been depressed within a three second time period and, if so, returns to step 210 to turn the white LED on the high intensity setting. If the white LED switch has not been depressed within three seconds, routine 200 proceeds to step 226 to determine if the white LED switch has been depressed after three seconds and, if so, turns the white LED off in step 204. Otherwise, the white LED remains on at the low intensity setting.

Accordingly, the intensity of the white LED is selectively changed when the LED switch is depressed within three seconds for each switch depression to switch the white LED sequentially from high to medium to low intensity settings, and to repeat the sequence. It should be appreciated that the intensity of the white LED light source may be changed using pulse width modulation (PWM) light control, according to one embodiment. According to another embodiment, the intensity of the white LED may be controlled using pulsed frequency modulation (PFM).

Figure 15:
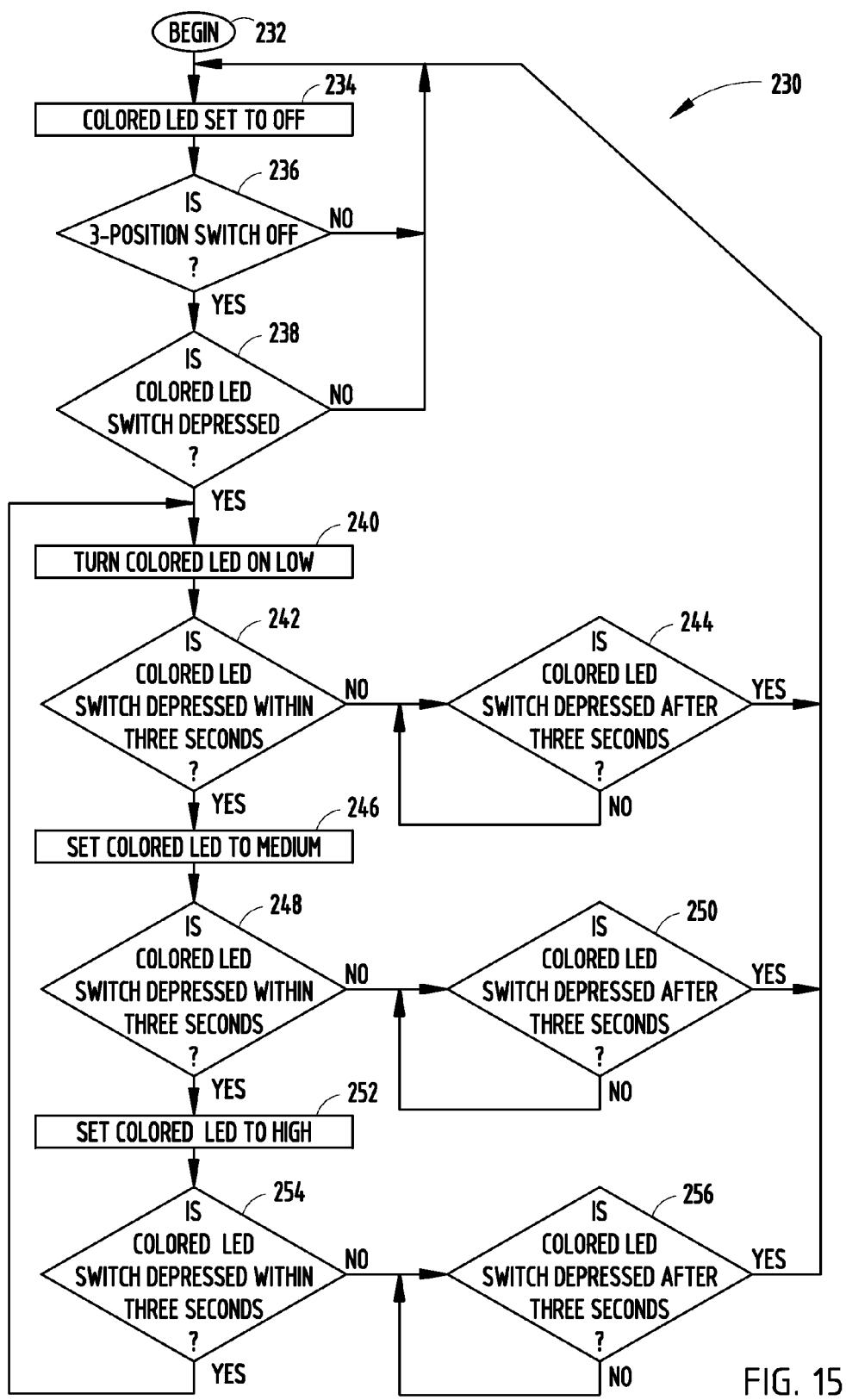
FIG. 15 is a flow diagram illustrating a control routine for controlling the colored LED, according to one embodiment.

Referring to FIG. 15, the colored light control routine 230 for controlling activation and further controlling intensity of the visible colored light source 14 is illustrated. Routine 230 begins at step 232 and proceeds to step 234 to set the colored LED to the off state. Next, in decision step 236, routine 230 determines if the three-position switch 22 is set to the off position and, if not, prevents activation of the visible colored light source and returns to step 234. If the three-position switch is set to the "off" position, routine 230 proceeds to step 238 to determine if the colored LED switch 24 is depressed and, if so, turns the colored LED on at a low intensity level in step 240, preferably setting the colored LED at the lowest intensity level. Accordingly, the colored LED, when turned on, is turned on to the lowest intensity setting. With the colored LED set to the low intensity level, routine 230 proceeds to decision step 242 to determine if the colored LED switch has been depressed within three seconds of turning the colored LED on low and, if so, proceeds to step 246 to set the colored LED to the next highest intensity setting, which in one embodiment is the medium intensity setting. If the colored LED switch has not been depressed within the three second time period, routine 230 proceeds to decision step 244 to determine if the colored LED switch is depressed after the three second time period and, if so, returns to step 234 to turn the colored LED off. However, if the colored LED switch is not depressed after three seconds, the colored LED remains on at the low intensity setting.

With the colored LED set to the medium intensity setting, routine 230 proceeds to step 248 to determine if the colored LED switch is depressed within a three second time period of setting the colored LED to the medium setting and, if so, proceeds to step 252 to set the colored LED to the next highest intensity setting, which in this embodiment is the highest intensity setting. If the colored LED switch has not been depressed within the three second time window, routine 230 proceeds to step 50 to determine if the colored LED switch is depressed after the three second time period and, if so, returns to step 234 to turn the colored LED off. Otherwise, the colored LED switch remains on at the medium intensity setting.

With the colored LED set to the high intensity setting, routine 230 proceeds to step 254 to determine if the colored LED switch has been depressed within a three second time period and, if so, returns to step 240 to adjust the colored LED setting to the low intensity setting. If the colored LED switch has not been depressed within three seconds, routine 200 proceeds to step 256 to determine if the colored LED switch has been depressed after three seconds and, if so, turns the colored LED off in step 234. Otherwise, the colored LED remains on at the high intensity setting.

Accordingly, the intensity of the colored LED may be selectively changed if the LED switch is depressed within three seconds for each switch depression to switch the colored LED sequentially from low to medium to high intensity settings and to repeat the sequence. It should be appreciated that the intensity of the colored LED light source may be changed using pulse width modulation (PWM) light control, according to one embodiment. According to another embodiment, the intensity of the colored LED may be controlled using pulsed frequency modulation (PFM).

The visible white light source 14 and colored light source 18 of lighting device 10 may be actuated and controlled in light intensity to provide desired intensity visible white and colored light beams. The lighting device 10 advantageously turns the visible white light source 14 on at a high intensity setting, whereas the colored light source 18 is turned on at a low intensity setting. This advantageously provides a user in the field with the ability to immediately realize bright white lighting from the white light source 14 on the one hand, whereas, on the other hand, the colored light may be used as a low profile light that turns on at low intensity and is less likely to be seen by an unwanted viewer in the field, particularly for a hunting application. While the light levels of intensity disclosed in the aforementioned embodiment include high, medium and low intensity settings, it should be appreciated that the visible white and colored light sources may be adjusted in different intensity levels, and may include a substantially continuous or ramped change in the level of light intensity, such as is discussed in the following embodiment.

Figure 16:
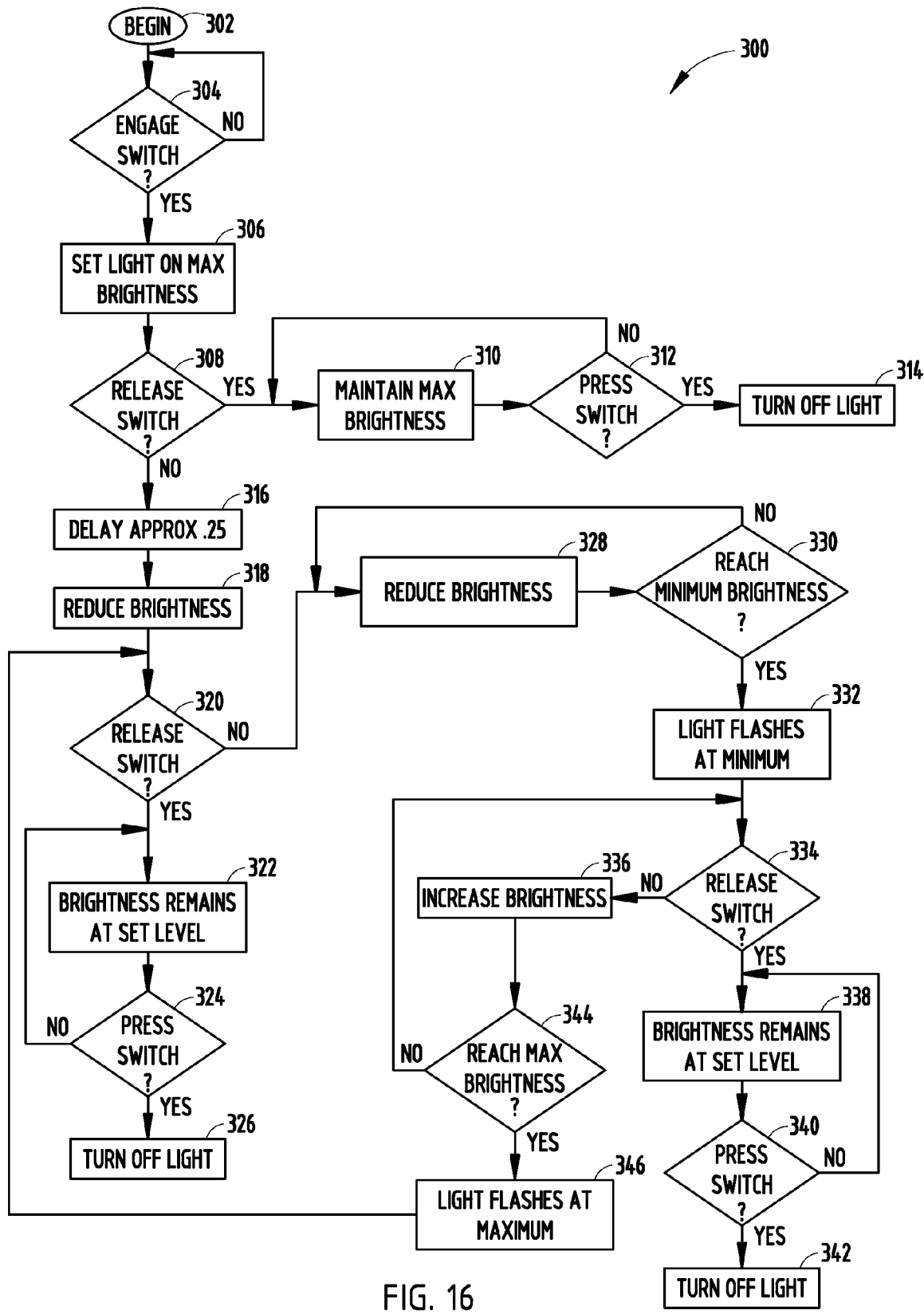
FIG. 16 is a flow diagram illustrating a routine for controlling light illumination intensity with the light control circuitry, according to one embodiment.

Referring to FIG. 16, a routine 300 is illustrated for providing user selectable light illumination intensity control of either one of the visible white light source 14 and colored light source 18. The light control routine 300 essentially processes the output signals of switches 24 and 26 and provides a controlled pulse width modulation signal to increase and decrease the intensity of the corresponding light beam generated by the corresponding light source. The pulse width modulation signal is supplied as an input to power the corresponding LED and has a duty cycle that is controlled to change the intensity of the light beam. To increase intensity of the light beam, the duty cycle of the pulse width modulated signal is increased, whereas to decrease intensity of the light beam the duty cycle of the pulse width modulation signal is decreased.

According to one embodiment, the microprocessor may employ an eight-bit PIC 16F616 having 256 output states to set the duty cycle of the pulse width modulated signal which, in this embodiment, allows the pulse width modulated signal to be adjusted incrementally in $\frac{1}{256}^{th}$ increments. At the maximum beam setting, the power supplied to the corresponding LED is continuous, with no duty cycle, whereas at the minimum light beam intensity, the duty cycle is set at about 12.5 percent, according to one example. When one of switches 24 and 26 is continuously depressed and the visible light is available, the duty cycle of the pulse width modulated signal supplied to the corresponding light source 14 or 18 is continuously increased and decreased to incrementally increase and decrease the light illumination intensity in a repeated ramp cycle, until the user no longer depresses the corresponding switch 24 or 26. Additionally, when the light source 14 or 18 approaches the maximum light intensity, the LED flashes and then begins to decrease in intensity and, when approaching the minimum light source, the LED flashes and then begins to increase in intensity. Thus, the light illumination intensity of the LED 14 or 18 cycles up and down repeatedly as the user continuously depresses and holds the corresponding switch 24 or 26 in the closed contact "on" position.

The light control routine 300, shown in FIG. 16 may be implemented as software executed by a controller, specifically the microprocessor. The light control routine 300 begins at step 302, proceeds to step 304 and, if the user selectable switch is engaged such that the electrical switch contact is closed, then proceeds to step 306 to set the light source on the maximum brightness. Next, method 300 proceeds to determine if the switch has been released such that the contact is open in decision step 308 and, if so, maintains the maximum brightness setting of the light source. Thereafter, in decision step 312, method 300 determines whether the switch has been pressed and, if so, turns the light source off in step 314. When the light source 14 or 18 is turned off, method 300 may enter a sleep mode in which no or very little power consumption is required by the control circuitry. If the switch 24 or 26 has not been pressed, the maximum brightness of the light source is maintained.

If the switch 24 or 26 has not been released as determined in step 308, method 300 proceeds to wait for a time delay of approximately 0.25 seconds in step 316, which provides a sufficient time to distinguish between an initial switch depression to turn the light on and off, and further desire to adjust brightness of the light source 14 or 18. Following the 0.25 second time delay, method 300 proceeds to decision step 320 to determine whether the switch has been released. If the switch is released, method 300 no longer reduces the brightness and maintains the brightness at the set level in step 322. With the brightness set at the set level, method 300 monitors the switch 24 or 26 to determine if the switch 24 or 26 has been depressed in decision step 324, and, if so, turns the light source 14 or 18 off in step 326. Otherwise, the brightness remains at the set level.

The light source 14 or 18 will continue to be incrementally decreased in brightness in step 318 with the switch continuously depressed, until a minimum brightness is reached. The reduction in brightness of the light source 14 or 18 may include an incremental decrease in brightness of the light source 14 or 18 by changing the duty cycle of the pulse width modulated signal, according to one embodiment. If decision step 320 determines that the switch 24 or 26 has been released, method 300 proceeds to step 328 to continue to reduce the brightness. In decision step 330, method 300 determines whether the minimum brightness has been reached, and, if not, continues to reduce the brightness of the light source 14 or 18. If the minimum brightness has been reached, method 300 proceeds to step 332 to cause the light source 14 or 18 to flash at the minimum brightness, thus providing the user with an indication that the minimum brightness level has been reached.

Once the minimum brightness has been reached and the light source 14 or 18 flashes at step 332, the light intensity begins to ramp up to increase the brightness as long as the corresponding switch 24 or 26 remains depressed. In decision step 334, method 300 will monitor whether the switch 24 or 26 has been released or not. If the switch 24 or 26 has not been released, the brightness continues to increase in step 336 until either the switch 24 or 26 is released or the maximum brightness level is reached. At decision step 344, routine 300 determines if the maximum brightness has been reached and, if not, returns to step 334 to determine if the switch 24 or 26 has been released. If the switch 24 or 26 is released, the brightness level remains at the set level in step 338. Thereafter, method 300 proceeds to monitor whether the switch 24 or 26 has been depressed in step 340, and, if so, turns the light source 14 or 18 off in step 342.

If the switch 24 or 26 has not been released and the brightness is increasing and in decision step 344 it is determined that the maximum brightness has been reached, then routine 300 flashes the light source 14 or 18 at the maximum brightness in step 346. It should be appreciated that the light source 14 or 18 is flashed at both maximum and minimum brightness levels to provide a user with an indication of reaching the extreme illumination intensity settings. The flash may be achieved by turning the light source 14 or 18 off and on one or more times. Following flash of the light source 14 or 18 in step 346, routine 300 returns to step 320 to determine if the corresponding switch 24 or 26 has been released and, if not, starts to repeat step 328 to reduce brightness of the light source 14 or 18. Accordingly, the light illumination intensity repeatedly cycles up and down when the switch 24 or 26 is continuously held in the closed contact position.

Accordingly, the light control routine 300 advantageously allows for a user to control the lighting device 10 by activating the corresponding switch 24 or 26 to turn the respective light source 14 or 18 on and off and to further adjust the intensity of the light illumination for both the visible white and colored light sources 14 and 18. By simply depressing the corresponding switches 24 or 26, the control circuitry is able to cyclically increase and decrease the light illumination intensity for the corresponding light source 14 or 18, respectively, thus offering the user the ability to select the desired intensity level of the light beam provided thereby.

It should be appreciated that the lighting device 10 may be useful in various applications. For example, the light body 12 may be connected to a mount assembly that enables the lighting device 10 to be employed on an article of clothing, such as a headband, a baseball cap or visor, or anywhere else.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:

1. A lighting device comprising:
  a housing;
  a light source provided on the housing, said light source comprising a first optic;
  a second optic in a light illumination path of the light source to focus light illumination into a desired beam; and
  a light transparent gel that remains in a non-hardened gel state and is disposed between the first optic of the light source and the second optic for enhancing the efficiency of light transmission from the first optic to the second optic, the light transparent gel having an index of refraction equal to that of the first optic.

2. The lighting device as defined in claim 1, wherein the light transparent gel comprises silicone.

3. The lighting device as defined in claim 2, wherein the light transparent gel comprises a silicone adhesive that is not fully cured.

4. The lighting device as defined in claim 1, wherein the first optic comprises a first lens and the second optic comprises a second lens.

5. The lighting device as defined in claim 4, wherein the light source comprises a light emitting diode having a diode component and the first lens, wherein the light transparent gel substantially fills a gap between the first lens and the second lens.

6. The lighting device as defined in claim 1, wherein the light transparent gel has an index of refraction greater than 1.1.

7. The lighting device as defined in claim 1, wherein the light transparent gel has an index of refraction of approximately 1.5.

8. The lighting device as defined in claim 1, wherein the light transparent gel has an index of refraction between 1.0 and 2.0.

9. The lighting device as defined in claim 1, wherein the light transparent gel has an index of refraction that substantially matches an index of refraction of at least one of the first and second optics.

10. The lighting device as defined in claim 1 further comprising a power source comprising at least one battery for supplying power to the light source.

11. The lighting device as defined in claim 1, wherein the second optic comprises a total internal reflectance (TIR) lens.

12. A lighting device comprising:
   a housing;
   a light source provided on the housing, said light source comprising a first lens;
   a power source for supplying power to the light source;
   a second lens in an optical light illumination path of the light source to focus light illumination into a desired beam; and
   a light transparent medium disposed between the first lens of the light source and the second lens, said light transparent medium having an index of refraction between an index of refraction of the first lens and an index of refraction of the second lens.

13. The lighting device as defined in claim 12, wherein the light transparent medium has an index of refraction greater than 1.1.

14. The lighting device as defined in claim 12, wherein the light transparent medium has an index of refraction of approximately 1.5.

15. The lighting device as defined in claim 12, wherein the light transparent medium has an index of refraction between 1.0 and 2.0.

16. The lighting device as defined in claim 12, wherein the light transparent medium comprises a light transparent gel.

17. The lighting device as defined in claim 16, wherein the light transparent gel comprises silicone.

18. The lighting device as defined in claim 17, wherein the light transparent gel comprises a silicone adhesive that is not fully cured.

19. The lighting device as defined in claim 12, wherein the light source comprises a light emitting diode having a diode component and the first lens, wherein the light transparent medium substantially fills a gap between the first lens and the second lens.

20. An optics package for a lighting device comprising:
   a light source comprising a light emitting diode component and a first optic;
   a second optic located near the first optic and in an optical lighting path of the light source;
   a gap between the first optic and the second optic;
   a light transparent gel that substantially fills the gap; and
   the light transparent gel comprises a silicone adhesive that is not fully cured.

21. A method of assembling an optics package for a lighting device, said method comprising the steps of:
   providing a light source comprising a light emitting diode component and a first optic;
   arranging a second optic located near the first optic and in an optical lighting path of the light source and defining a gap between the first optic and the second optic; and
   substantially filling the gap by disposing a light transparent gel into the gap.

22. The method as defined in claim 21, wherein the step of disposing a light transparent gel comprises disposing silicone.

23. The method as defined in claim 22, wherein the silicone is not hardened.

24. The method as defined in claim 21 further comprising the step of disposing the optics package into a lighting device.

25. The method as defined in claim 21, wherein the light transparent gel has an index of refraction greater than 1.1.

26. The method as defined in claim 21, wherein the light transparent gel has an index of refraction of approximately 1.5.

27. The method as defined in claim 21, wherein the light transparent gel has an index of refraction between 1.0 and 2.0.

28. The method as defined in claim 21, wherein the first optic comprises a first lens and the second optic comprises a second lens.

29. The method as defined in claim 28, wherein the light transparent gel has an index of refraction that substantially matches an index of refraction of at least one of the first and second lenses.

30. The method as defined in claim 28, wherein the second lens comprises a total internal reflectance (TIR) lens.

* * * * *